(12) United States Patent
Lerner

(10) Patent No.: US 12,523,492 B2
(45) Date of Patent: Jan. 13, 2026

(54) SYSTEMS AND METHODS FOR GENERATING DROP-OFF POINT MAPS

(71) Applicant: Toyota Jidosha Kabushiki Kaisha, Toyota (JP)

(72) Inventor: Emily Lerner, Ypsilanti, MI (US)

(73) Assignee: Toyota Jidosha Kabushiki Kaisha (JP)

( * ) Notice: Subject to any disclaimer, the term of this patent is extended or adjusted under 35 U.S.C. 154(b) by 100 days.

(21) Appl. No.: 18/417,195

(22) Filed: Jan. 19, 2024

(65) Prior Publication Data

US 2025/0237526 A1 Jul. 24, 2025

(51) Int. Cl.
*G01C 21/00* (2006.01)
*G01C 21/34* (2006.01)

(52) U.S. Cl.
CPC ...... *G01C 21/3811* (2020.08); *G01C 21/3438* (2013.01)

(58) Field of Classification Search
None
See application file for complete search history.

(56) References Cited

U.S. PATENT DOCUMENTS

| | | | |
|---|---|---|---|
| 11,022,452 B2 | 6/2021 | Dyer et al. | |
| 11,280,625 B2 | 3/2022 | Pandit et al. | |
| 11,373,534 B2 | 6/2022 | Eigel et al. | |
| 11,465,614 B2 | 10/2022 | Sonalker | |
| 2015/0206267 A1* | 7/2015 | Khanna | G06Q 30/0629 705/417 |
| 2019/0129438 A1 | 5/2019 | Morita et al. | |
| 2019/0265703 A1* | 8/2019 | Hicok | G06Q 10/02 |
| 2020/0041301 A1* | 2/2020 | Jalasutram | H04W 4/029 |
| 2021/0108929 A1* | 4/2021 | Zhang | G01C 21/3438 |
| 2023/0023913 A1 | 1/2023 | Thibaux et al. | |
| 2023/0219595 A1* | 7/2023 | Kashem | G01S 17/89 701/23 |

FOREIGN PATENT DOCUMENTS

WO WO-2022143146 A1 * 7/2022 ......... G06F 16/9537

* cited by examiner

*Primary Examiner* — Daniel L Greene
(74) *Attorney, Agent, or Firm* — Dinsmore & Shohl LLP

(57) ABSTRACT

A system and method for generating drop-off points in a map includes a location sensor configured to detect a location of a vehicle, a proximity sensor configured to detect a disembarkation of a user from the vehicle and collect geometric features around the location, one or more sensors configured to monitor driving and stopping patterns of the vehicle at the location, and a processor. The processor is configured to generate a drop-off probability of the location based on the disembarkation of the user from the vehicle, the driving and stopping patterns of the vehicle, and the geometric features around the location, determine whether the drop-off probability is greater than a drop-off threshold, and in response to a determination that the drop-off probability is greater than the drop-off threshold, label the location as a drop-off point in the map.

20 Claims, 4 Drawing Sheets

SYSTEMS AND METHODS FOR GENERATING DROP-OFF POINT MAPS

TECHNICAL FIELD

The present disclosure relates to systems and methods for map information generation, more specifically, to systems and methods for map information generation for drop-off points.

BACKGROUND

Route planning involves identifying a destination point, but frequently, the selected destination may not be the most convenient drop-off location for a user, necessitating additional steps for the driver or passenger to locate a more desirable drop-off point near the intended destination. Relying on route planning with a map lacking information on drop-off points can result in suboptimal routes, missed stops, extended travel durations, and unpredictable delivery or arrival times. It may also hinder the ability to efficiently balance workloads among drivers or resources. Accordingly, a need exists for a system and method for generating drop-off points in a map to enhance routing planning capability.

SUMMARY

In one embodiment, a system for generating drop-off points in a map includes a location sensor configured to detect a location of a vehicle, a proximity sensor configured to detect a disembarkation of a user from the vehicle and collect geometric features around the location, one or more sensors configured to monitor driving and stopping patterns of the vehicle at the location, and a processor. The processor is configured to generate a drop-off probability of the location based on the disembarkation of the user from the vehicle, the driving and stopping patterns of the vehicle, and the geometric features around the location, determine whether the drop-off probability is greater than a drop-off threshold, and in response to a determination that the drop-off probability is greater than the drop-off threshold, label the location as a drop-off point in the map.

In another embodiment, a method for generating drop-off points in a map includes generating a drop-off probability of a location based on an disembarkation of a user from a vehicle, driving and stopping patterns of the vehicle, and geometric features around the location, determining whether the drop-off probability is greater than a drop-off threshold, and in response to a determination that the drop-off probability is greater than the drop-off threshold, labeling the location as a drop-off point in the map. The location is detected by a location sensor. The disembarkation and the geometric features are detected by a proximity sensor. The driving and stopping patterns of the vehicle are monitored by one or more sensors.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
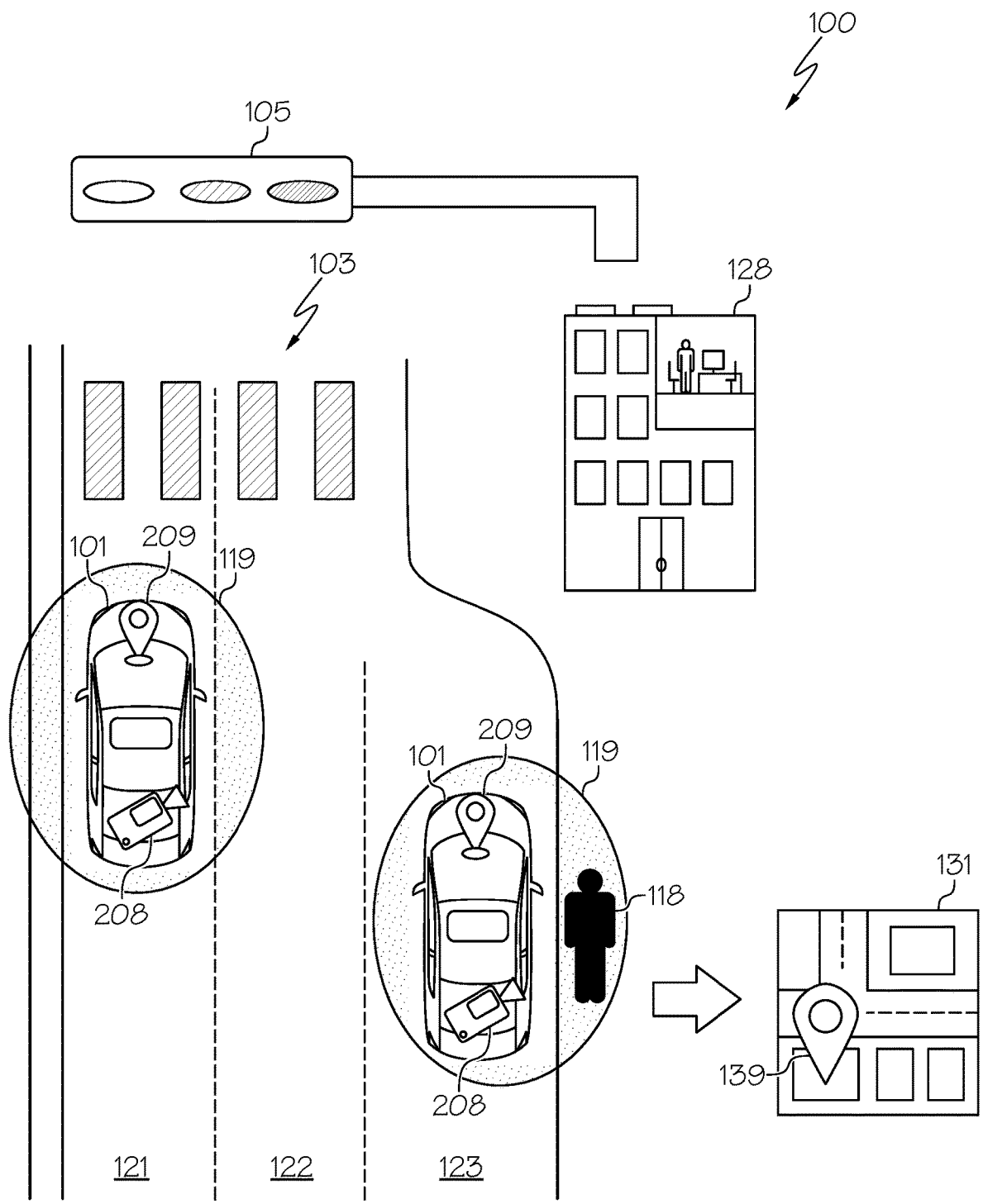
FIG. 1 schematically depicts an example system for drop-off point generation of the present disclosure, in accordance with one or more embodiments shown and described herewith.

The embodiments disclosed herein include systems and methods for drop-off point generation in a map. When a destination lacks information about drop-off points, it can result in less efficient routes, missed stops, extended travel durations, and unpredictable delivery or arrival times. This often requires additional time for drivers to locate suitable drop-off points near the destination, potentially impeding the equitable distribution of workloads among drivers and resources. Furthermore, destinations lacking drop-off information may increase the likelihood of passengers being dropped off at inconvenient or less desirable locations. In contrast, planning routes in accordance with maps that include designated drop-off points can enhance efficiency. These designated points allow for the application of advanced route planning algorithms to optimize the sequence of stops, minimizing travel time and reducing operational expenses. The inclusion of drop-off points facilitates the fine-tuning of route planning to balance workloads, enhance customer satisfaction, provide more accurate delivery time estimates, and allow real-time adjustments in response to changing conditions. Using the drop-off point map can reduce the risk of accidents or confusion, as passengers are guided to specific drop-off locations rather than arbitrary points on the map. Accordingly, the systems and methods for generating drop-off points in a map, as presented herein, can result in improved efficiency, cost reduction, and an enhanced overall experience in various transportation and delivery services.

Various embodiments of the methods and systems for generating drop-off points in a map are described in more detail herein. Whenever possible, the same reference numerals will be used throughout the drawings to refer to the same or like parts.

As used herein, the singular forms "a," "an" and "the" include plural referents unless the context clearly dictates otherwise. Thus, for example, reference to "a" component includes aspects having two or more such components unless the context clearly indicates otherwise.

Figure 2:
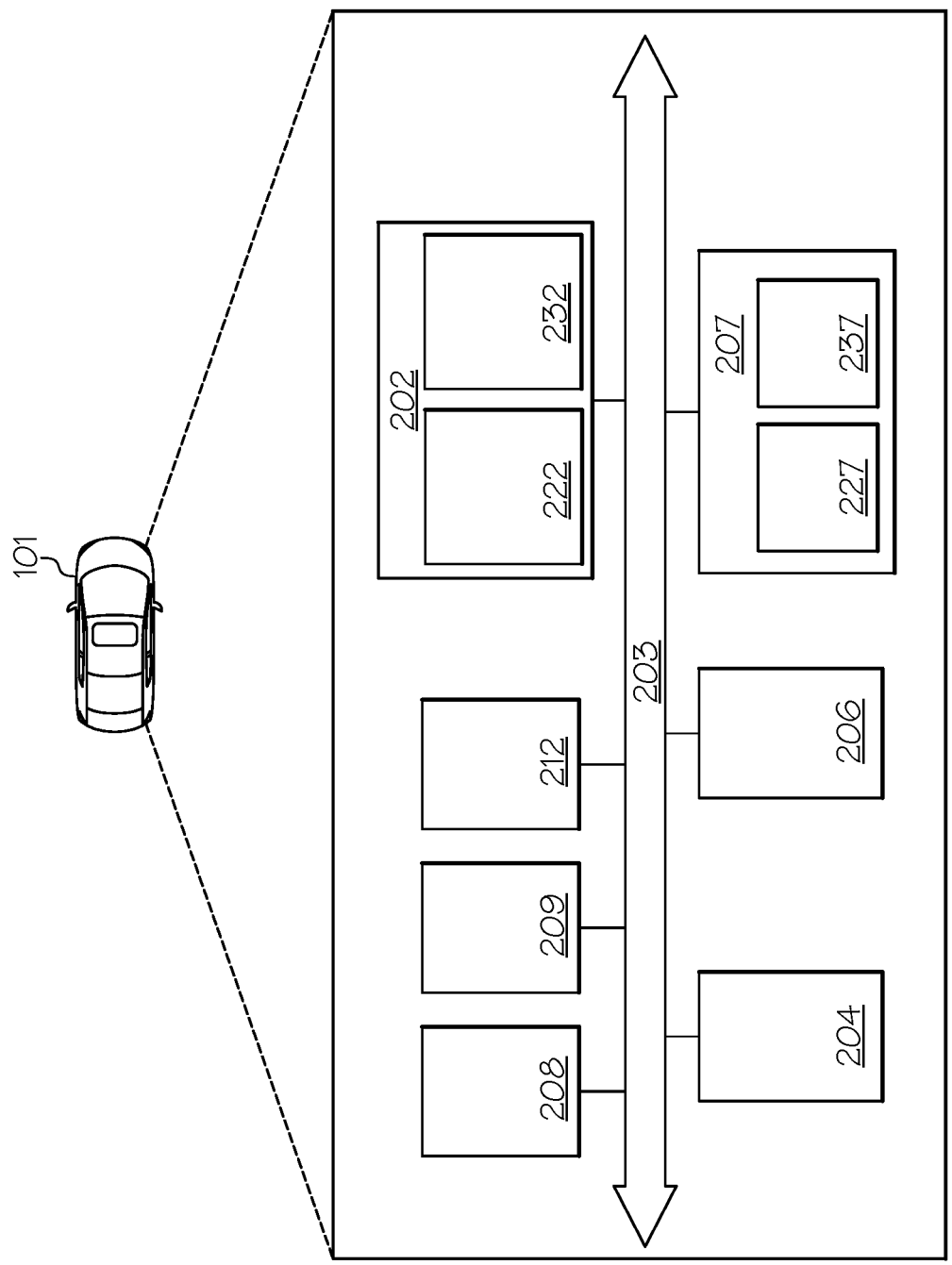
FIG. 2 schematically depicts example components of the system for drop-off point generation of the present disclosure, according to one or more embodiments shown and described herein.

Referring to the figures, FIG. 1 schematically depicts an example drop-off point generation system 100. The drop-off point generation system 100 may include one or more vehicles 101. The vehicle 101 may include a location sensor 209 configured to detect a location 119 of the vehicle 101, a proximity sensor 208 configured to detect the disembarkation of a user 118 from the vehicle 101 and collect geometric features around the location 119, one or more other sensors 212 (e.g., as illustrated in FIG. 2) configured to monitor driving and stopping patterns of the vehicle 101 at the location 119. The drop-off point generation system 100 may further include one or more servers. The drop-off point generation system 100 may further include a communication device, such as vehicle network interface hardware 206 (e.g. as illustrated in FIG. 2), operable to wirelessly communicate between the vehicles 101 and one or more servers.

Each of the vehicles 101 may be an automobile or any other passenger or non-passenger vehicle such as, for example, a terrestrial, aquatic, and/or airborne vehicle. Each of the vehicles 101 may be an autonomous vehicle that navigates its environment with limited human input or without human input. Each of the vehicles 101 may drive on a road and perform vision-based lane centering, e.g., using a sensor. Each of the vehicles 101 may include actuators for driving the vehicle, such as a motor, an engine, or any other powertrain. The vehicles 101 may move on various surfaces, such as, without limitations, roads, highways, streets, expressways, bridges, tunnels, parking lots, garages, off-road trails, railroads, or any surfaces where the vehicles may operate.

In embodiments, each of the vehicle 101 may include a network interface hardware 206 and communicate with each other or the server via wireless communications. The vehicle 101 may transmit, without limitations, locations 119 of the vehicles 101, disembarkation of the user 118, geometric features around the locations 119, the driving and stopping patterns of the vehicles 101, generated drop-off probabilities of each location 119, drop-off thresholds, and maps with drop-off points. Each of the vehicles 101 may include one or more proximity sensors 208, one or more location sensors 209, and one or more other sensors 212. The location sensors 209 may generate location information of the vehicle 101. The proximity sensors 208 may be used to detect the environment around the vehicle 101. The drop-off point generation system 100 may generate the geometric features around the location 119 based on the proximity sensor data. The geometric features may include, without limitations, lane marking (such as the left lane 121, middle lane 122, and right lane 123), curb and gutter, road shoulder, intersection, traffic islands, roundabouts, median, sidewalks, crosswalks 103, ramps, bike lanes, speed humps and bumps, traffic light 105, bus stops, parking area, and service roads.

The other sensors 212 may monitor the operation of the vehicle 101 such as, without limitations, speed, direction, orientation, and acceleration of the vehicle 101. The other sensors 212 may also determine the state of the vehicle, such as whether the doors of the vehicle 101 are open or closed. In some embodiments, the drop-off point generation system 100 may use the location information and the detected environment to further provide a narrower area of the location 119 compared with the location information provided by the location sensor 209. The system may use the proximity sensor 208 and the other sensors 212 to monitor the open/close state of the vehicle doors and disembarkations of one or more users 118.

The drop-off point generation system 100 may generate the drop-off probability of the location 119 based on the disembarkation of the user 118 from the vehicle 101, the driving and stopping patterns of the vehicle 101, and geometric features around the location 119. In some embodiments, the drop-off probability may be further determined based on whether one or more points of interest (POIs) 128 is in the proximity of the location 119. The POIs 128 may include, without limitations, shopping centers, restaurants, tourist attractions, office buildings, hotels, public transportation hubs, event venues, stadiums, and convention centers. The information and locations of the POIs may be detected by the proximity sensors 208 or be available on the map 131.

The drop-off point generation system 100 may use one or more modules to estimate a drop probability of the location 119, and further determine whether the stop and the embarkations of the user 118 is during a non-drop-off event. In response to determining that the stop at location 119 is associated with a drop-off point 139, given that the drop-off probability is greater than a predetermined drop-off threshold, the drop-off point generation system 100 may add the drop-off point 139 to the map 131. In response to determining that the stop at location 119 is associated with a non-drop-off event, the drop-off point generation system 100 may exclude the location 119 as the drop-off point 139 from the map 131.

For example, as illustrated in FIG. 1, the other sensors 212 may detect the vehicle 101 decelerating and stopping at the right lane 123. The other sensors 212 further detect that at least one door of the vehicle 101 is open. The proximity sensor 208 detects the user 118 disembarks from the vehicle 101. The proximity sensor 208 may determine the geometric features around the location 119 as a curb and a sidewalk. The drop-off point generation system 100 may monitor the braking and idle time at the location 119, the use of hazard lights, and whether the vehicle 101 detours onto an area not designated as a road. The drop-off point generation system 100 may generate a drop-off probability of the location 119 based on the detected geometric features and driving and stopping patterns of the vehicle 101. Further, the drop-off point generation system 100 may determine the stop and embarkation of the user 118 is not a non-drop-off event based on the detection of the curb and sidewalk that the user 118 steps on. Accordingly, the drop-off point generation system 100 may add the location 119 as the drop-off point 139 to the map 131. In another scenario, the system may determine the stop is a non-drop-off event after detecting a crosswalk 103 in front of the vehicle 101, a traffic light 105 in front of the vehicle 101, and/or the location 119 of the vehicle 101 on the left lane 121 of a three-lane road (including a left lane 121, a middle lane 122, and a right lane 123). In this scenario, the drop-off point generation system 100 may exclude the location 119 as the drop-off point 139 from the map 131.

In some embodiments, when the drop-off probability of the location 119 is less or equal to the predetermined drop-off threshold. The drop-off point generation system 100 may take further steps to determine whether historical locations share essentially the same global position system (GPS) coordinate with the location 119 and further determine whether to add the GPS coordinate as the drop-off point 139 to the map 131, as provided in detail further below.

In embodiments, the system may include one or more modules, such as a drop-off module 222 and a cluster module 232, which may be pre-trained using training data of the training drop-off location, including ground-truth examples and scenarios where vehicles stop at a location, vehicles drop off one or more users at a location. The pre-training may include labeling the vehicles, disembarked users, and geometric features near the location, and using one or more neural networks to learn to predict the desirable and undesirable drop-off point results based on the training data. The pre-training may further include fine-tuning, evaluation, and testing steps. The one or more modules may be continuously trained using the real-world collected data to adapt to changing conditions and factors and improve the performance over time.

Referring to FIG. 2, example components of the drop-off point generation system 100 are schematically depicted. While FIG. 2 depicts one vehicle 101, more than two vehicles 101 may be included and may communicate with each other or with servers. The vehicle 101 may include one or more processors 204. Each of the one or more processors 204 may be any device capable of executing machine-readable and executable instructions. The instructions may be in the form of a machine-readable instruction set stored in data storage component 207 and/or the memory component 202. Accordingly, each of the one or more processors 204 may be a controller, an integrated circuit, a microchip, a computer, or any other computing device. The one or more processors 204 are coupled to a communication path 203 that provides signal interconnectivity between various modules of the system. Accordingly, the communication path 203 may communicatively couple any number of processors 204 with one another, and allow the modules coupled to the communication path 203 to operate in a distributed computing environment. Specifically, each of the modules may operate as a node that may send and/or receive data. As used herein, the term "communicatively coupled" means that coupled components are capable of exchanging data signals with one another such as for example, electrical signals via a conductive medium, electromagnetic signals via air, optical signals via optical waveguides, and the like.

Accordingly, the communication path 203 may be formed from any medium that is capable of transmitting a signal such as for example, conductive wires, conductive traces, optical waveguides, or the like. In some embodiments, the communication path 203 may facilitate the transmission of wireless signals, such as WiFi, Bluetooth®, Near Field Communication (NFC), and the like. Moreover, the communication path 203 may be formed from a combination of mediums capable of transmitting signals. In one embodiment, the communication path 203 comprises a combination of conductive traces, conductive wires, connectors, and buses that cooperate to permit the transmission of electrical data signals to components such as processors, memories, sensors, input devices, output devices, and communication devices. Accordingly, the communication path 203 may comprise a vehicle bus, such as for example a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal wave, triangular wave, square wave, vibration, and the like, capable of traveling through a medium.

The vehicle 101 may include one or more memory components 202 coupled to the communication path 203. The one or more memory components 202 may comprise RAM, ROM, flash memories, hard drives, or any device capable of storing machine-readable and executable instructions such that the machine-readable and executable instructions can be accessed by the one or more processors 204. The machine-readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable and executable instructions and stored on the one or more memory components 202. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The one or more processor 204 along with the one or more memory components 202 may operate as a controller for the vehicle 101.

The one or more memory components 202 may include one or more modules, including the drop-off module 222 and the cluster module 232. Each of the one or more modules may include, but is not limited to, routines, subroutines, programs, objects, components, data structures, and the like for performing specific tasks or executing specific data types as will be described below. The data storage component 207 stores historical location 227 and drop-off point data 237. The historical location 227 may include, without limitations, the GPS coordinates of the location, the road and lane geometry data around the location, the drop-off probability of the location, data generated by the various sensors such as the proximity sensor 208, the location sensor 209, the other sensors 212, and data of operating vehicles 101. The drop-off point data 237 may include the historical drop-off points, including the drop-off points removed from the map, and the associated drop-off probabilities of the historical locations or the GPS coordinates. The drop-off module 222 and the cluster module 232 may also be stored in the data storage component 207 during operating or after operation.

The vehicle 101 may include network interface hardware 206 for communicatively coupling the vehicle 101 to another vehicle 101 and/or a server. The network interface hardware 206 can be communicatively coupled to the communication path 203 and can be any device capable of transmitting and/or receiving data via a network. Accordingly, the network interface hardware 206 can include a communication transceiver for sending and/or receiving any wired or wireless communication. For example, the network interface hardware 206 may include an antenna, a modem, LAN port, WiFi card, WiMAX card, mobile communications hardware, near-field communication hardware, satellite communication hardware, and/or any wired or wireless hardware for communicating with other networks and/or devices. In one embodiment, the network interface hardware 206 includes hardware configured to operate in accordance with the Bluetooth® wireless communication protocol. The network interface hardware 206 of the vehicle 101 may transmit its data to another vehicle 101 or a server. For example, the network interface hardware 206 of the vehicle 101 may transmit vehicle data, location data, and drop-off point data, to another vehicle 101 or a server.

The vehicle 101 may include one or more proximity sensors 208. Each of the proximity sensors 208 is coupled to the communication path 203 and communicatively coupled to the one or more processors 204. The one or more proximity sensors 208 may include a selection of, without limitations, a vision sensor, a camera, light detection and ranging (LIDAR) sensor, a thermal image sensor, an infrared sensor, an ultrasonic sensor, and/or a combination thereof. The camera may be, without limitation, an RGB camera, a depth camera, an infrared camera, a wide-angle camera, or a stereoscopic camera. The one or more proximity sensors 208 may be any device having an array of sensing devices capable of detecting radiation in an ultraviolet wavelength band, a visible light wavelength band, or an infrared wavelength band. The one or more proximity sensors 208 may have any resolution. In some embodiments, one or more optical components, such as a mirror, fish-eye lens, or any other type of lens may be optically coupled to the one or more proximity sensors 208. In embodiments, the one or more proximity sensors 208 may provide image data to the one or more processors 204 or another component communicatively coupled to the communication path 203. In some embodiments, the one or more proximity sensors 208 may also provide navigation support. That is, data captured by the one or more proximity sensors 208 may be used to autonomously or semi-autonomously navigate a vehicle.

In some embodiments, the one or more proximity sensors 208 may include one or more imaging sensors configured to operate in the visual and/or infrared spectrum to sense visual and/or infrared light. Additionally, while the particular embodiments described herein are described concerning hardware for sensing light in the visual and/or infrared spectrum, it is to be understood that other types of sensors are contemplated. For example, the system 100 may include one or more LIDAR sensors, radar sensors, sonar sensors, or other types of sensors for gathering data that could be integrated into or supplement the data collection described herein. Ranging sensors like radar may be used to obtain rough depth and speed information for the view of the vehicle 101.

The vehicle 101 may include one or more location sensors 209 to collect location data of the vehicles 101, such as GPS coordinates, and associate the location data with the corresponding geographical location using latitude and longitude coordinates. Each of the location sensors 209 is coupled to the communication path 203 and communicatively coupled to the one or more processors 204. The location sensors 209 used on the vehicles 101 may be a GPS sensor, a compass, a global navigation satellite system (GLONASS), a Galileo system, a BeiDou system, or the like.

The vehicle 101 may include one or more other sensors 212. Each of the one or more other sensors 212 is coupled to the communication path 203 and communicatively coupled to the one or more processors 204. The one or more other sensors 212 may include one or more motion sensors for detecting and measuring motion and changes in the motion of a vehicle. The motion sensors may include inertial measurement units. Each of the one or more motion sensors may include one or more accelerometers and one or more gyroscopes. Each of the one or more motion sensors transforms the sensed physical movement of the vehicle into a signal indicative of an orientation, a rotation, a velocity, or an acceleration of the vehicle. The one or more sensors 212 may also include one or more door sensors. The door sensor may be, without limitations, a magnetic sensor, a motion-detection sensor, an optical sensor, a pressure sensor, or a microswitch sensor. The door sensor may detect whether one or more vehicle doors are open and how wide the doors are opened. The drop-off point generation system 100 may use the proximity sensors 208 and the other sensors 212, such as the motion sensors, to generate the drop-off probability of the location 119. For example, the sensors may detect the orientation, rotation, velocity, or acceleration of the vehicle 101 for the drop-off point generation system 100 to determine whether the location is a drop-off point.

In some embodiments, the vehicle 101 may transfer the collected sensory data to a server for generation of drop-off probability and/or further determining whether a location 119 is a drop-off point 139 in the map 131. The server may include one or more server processors, one or more server memory components, server data storage component, server network interface hardware, and a server local interface. The one or more server processors may be a controller, an integrated circuit, a microchip, a computer, or any other computing device. The one or more server memory components may comprise RAM, ROM, flash memories, hard drives, or any device capable of storing machine-readable and executable instructions such that the machine-readable and executable instructions can be accessed by the one or more server processors. The one or more server memory components may include one or more server modules, such as the drop-off module 222 and the cluster module 232. The server data storage component may store the historical location data 227 and the drop-off point data 237. The drop-off module 222 and the cluster module 232 may also be stored in the data storage component. The one or more server modules may include, without limitations, routines, subroutines, programs, objects, components, data structures, and the like for performing specific tasks or executing specific data types.

Figure 3:
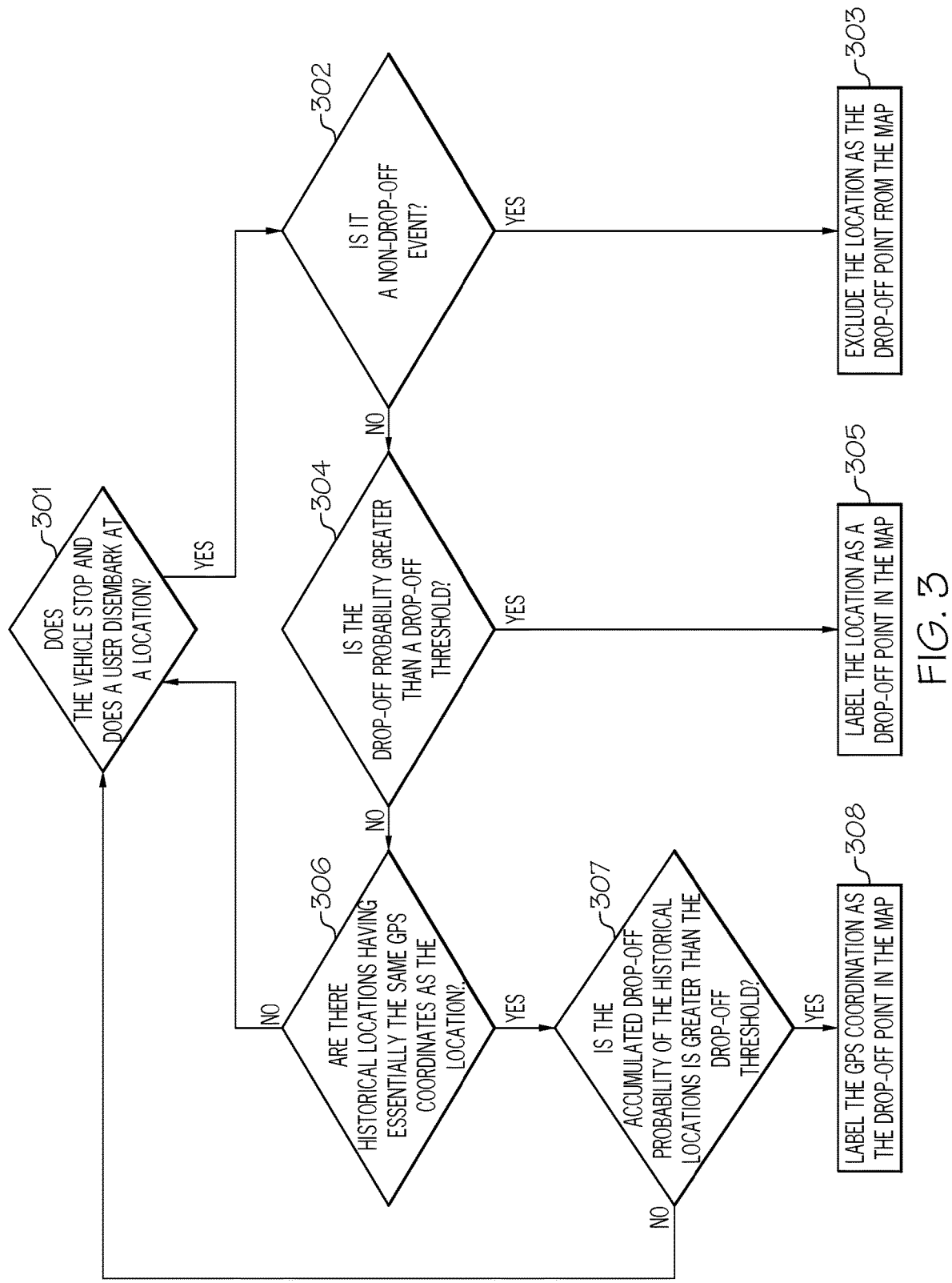
FIG. 3 depicts an illustrative block diagram of the drop-off point generation in the example system of the present disclosure, according to one or more embodiments shown and described herein.

Referring to FIG. 3, an illustrative block diagram of the drop-off point generation in the drop-off point generation system 100 is depicted. At block 301, the drop-off point generation system 100 may determine whether the vehicle 101 stops or/and whether one or more users disembark from the vehicle 101 at the location 119. In response to a no to the block 301, the drop-off point generation system 100 may continue monitoring the vehicle 101 to determine whether the vehicle 101 stops or/and whether one or more users disembark from the vehicle 101 at the location 119.

In response to a yes to the block 301, at block 302, the drop-off point generation system 100 may determine whether the stopping is associated with a non-drop-off event. The stopping associated with the non-drop-off event may be, without limitations, a traffic light or signal stopping, a limited-parking stopping, a stopping on narrow roads, a stopping at blind corners, a stopping at intersections, a stopping at crosswalks, or a stopping on one high-speed road. In response to a yes to the block 302, at block 303, the drop-off point generation system 100 may exclude the location 119 as the drop-off point 139 from the map 131. In response to a no to the block 302, at block 304, the drop-off point generation system 100 may determine whether the drop-off probability is greater than a drop-off threshold. The drop-off point generation system 100 may generate the drop-off probability of the location 119 based on the disembarkation of the user 118 from the vehicle 101, the driving and stopping patterns of the vehicle 101, and the geometric features around the location 119.

In response to a yes to the block 304, at block 305, the drop-off point generation system 100 may label the location as a drop-off point in the map. In response to a no to the block 304, at block 306, the drop-off point generation system 100 may determine, using the cluster module 232 which may include a cluster algorithm, whether a group of historical locations has essentially the same GPS coordinates as the location 119. The drop-off point generation system 100 may determine a historical location has a GPS coordinate essentially the same as the location 119 when the difference between the GPS coordinate of the historical location and the GPS coordinates of the location 119 is less than a GPS coordinate difference threshold. The GPS coordinate different threshold may be predetermined and further tuned by the drop-off module 222 based on the continuously collected data and added drop-off points 139 to the map 131. In response to a no to the block 306, at block 301, the drop-off point generation system 100 may continue monitoring the vehicle 101 to determine whether the vehicle 101 stops or/and whether one or more users disembark from the vehicle 101 at the location 119.

In response to a yes to the block 306, at block 307, the drop-off point generation system 100 may further determine whether an accumulated drop-off probability of the historical locations is greater than the drop-off threshold. The drop-off point generation system 100 may group the historical locations having the drop-off probabilities less than or equal to the drop-off threshold, accumulate the drop-off probability for the historical locations, and further assign the GPS coordinate as a potential drop-off point of the location 119. In embodiments, the drop-off probability of each historical location may be accumulated to the accumulated drop-off probability by weighting a deviation distance from each historical location to the GPS coordinate. For instance, the drop-off point generation system 100 may calculate the deviation distance using the Haversine formula or another distance calculation method and assign weights to each historical location based on the deviation distance (e.g. assigning weights inversely proportional to the deviation distances). The drop-off point generation system 100 may further normalize the weight and weight and accumulate the historical drop-off probabilities associated with the historical locations to generate the accumulated drop-off probability. In response to a yes to the block 307, at block 308, the drop-off point generation system 100 may label the GPS coordination as the drop-off point in the map. In response to a no to the block 307, at block 301, the drop-off point generation system 100 may continue monitoring the vehicle 101 to determine whether the vehicle 101 stops or/and whether one or more users disembark from the vehicle 101 at the location 119.

Figure 4:
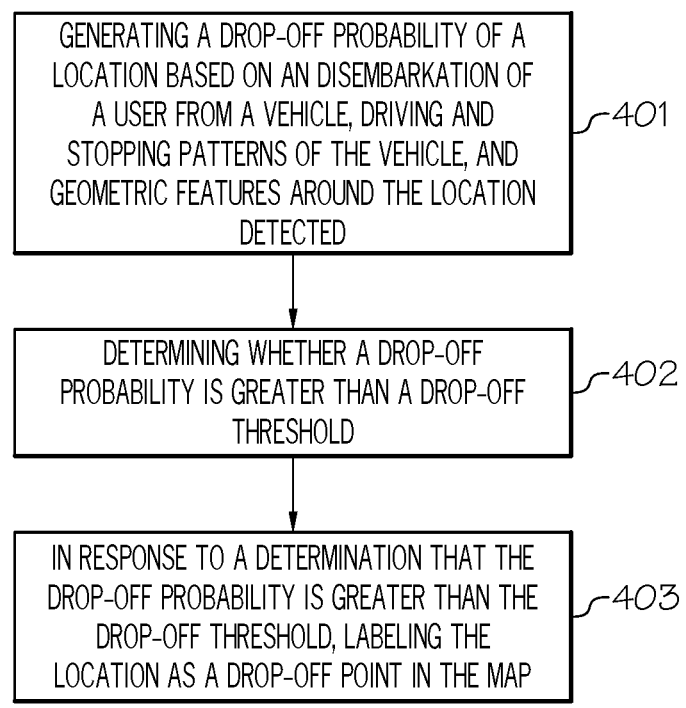
FIG. 4 depicts a flowchart of illustrative steps for the drop-off point generation of the present disclosure, according to one or more embodiments shown and described herein.

Referring to FIG. 4, a flowchart of illustrative steps for the drop-off point generation is depicted. At block 401, the method for drop-off point generation in a map 131 may include generating a drop-off probability of a location 119 based on an disembarkation of a user 118 from a vehicle 101, driving and stopping patterns of the vehicle 101, and geometric features around the location 119.

In embodiments, the driving and stopping patterns may be, without limitations, selected from braking patterns, idling patterns, hazard light usage patterns, detour patterns, vehicle door operation patterns, or a combination thereof. The drop-off probability may be generated further based on proximity to one or more POIs 128. The POIs 128 may include shopping centers, restaurants, tourist attractions, office buildings, hotels, public transportation hubs, event venues, stadiums, and convention centers.

At block 402, the method for drop-off point generation in a map may include determining whether a drop-off probability is greater than a drop-off threshold.

At block 403, the method for drop-off point generation in a map may include in response to a determination that the drop-off probability is greater than the drop-off threshold, labeling the location 118 as a drop-off point 139 in the map 131.

In embodiments, the method for drop-off point generation in a map may further include determining whether the stopping is associated with a non-drop-off event, in response to a determination of the non-drop-off event, excluding the location as the drop-off point from the map, and wherein the stopping associated with the non-drop-off event is a traffic light 105 or signal stopping, a limited-parking stopping, a stopping on narrow roads, a stopping at blind corners, a stopping at intersections, a stopping at crosswalks 103, or a stopping on one high-speed road.

In embodiments, the method for drop-off point generation in a map may further include grouping, using the cluster algorithm, historical locations with essentially the same global positioning system (GPS) coordinate as a potential drop-off point of the location 119, wherein the drop-off probability associated with each historical location is less than or equal to the drop-off threshold, determining whether an accumulated drop-off probability of the historical locations is greater than the drop-off threshold, in response to a determination that the accumulated drop-off probability is greater, labeling the GPS coordinate as the drop-off point in the map. The drop-off probability of each historical location may be accumulated to the accumulated drop-off probability by weighting a deviation distance from each historical location to the GPS coordinate.

In embodiments, the method for drop-off point generation in a map may further include adjusting a destination based on one or more drop-off points 139 near the destination provided by a user. The method may include determining whether one or more drop-off points 139 are in proximity to the destination provided by the user. The method may further include selecting the closest drop-off point 139 or the drop-off point 139 requiring the least detouring, such as a drop-off point 139 across the street or within a block.

In embodiments, the method for drop-off point generation in a map may further include updating drop-off points 139 in the map 131 based on user feedback and user operation of the vehicle 101. The user feedback may include, without limitations, suggestions that a drop-off point 139 is not suitable for drop-off. The user operation of the vehicle 101 may include dropping off a second user at a location 119 near the drop-off point 139 suggested to the second user. The method for drop-off point generation in a map may further include updating the drop-off probability of the location based on continuous collections of user feedback and the operation of the vehicle 101.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for generating drop-off points in a map comprising:
   a location sensor configured to detect a location of a vehicle;
   a proximity sensor configured to detect a disembarkation of a user from the vehicle and collect geometric features around the location;
   one or more sensors configured to monitor driving and stopping patterns of the vehicle at the location; and
   a processor configured to:
   generate a drop-off probability of the location based on the disembarkation of the user from the vehicle, the driving and stopping patterns of the vehicle, and the geometric features around the location;

determine whether the drop-off probability is greater than a drop-off threshold; and in response to a determination that the drop-off probability is greater than the drop-off threshold, label the location as a drop-off point in the map.

2. The system of claim 1, wherein the driving and stopping patterns are selected from braking patterns, idling patterns, hazard light usage patterns, detour patterns, vehicle door operation patterns, or a combination thereof.

3. The system of claim 1, wherein the processor is configured to further:

determine whether the stopping is associated with a non-drop-off event, and in response to a determination of the non-drop-off event, exclude the location as the drop-off point from the map.

4. The system of claim 3, wherein the stopping associated with the non-drop-off event is a traffic light or signal stopping, a limited-parking stopping, a stopping on narrow roads, a stopping at blind corners, a stopping at intersections, a stopping at crosswalks, or a stopping on one high-speed road.

5. The system of claim 1, wherein the system further comprises a cluster algorithm to group historical locations with essentially the same global positioning system (GPS) coordinate as a potential drop-off point of the location, wherein the drop-off probability associated with each historical location is less than or equal to the drop-off threshold.

6. The system of claim 5, wherein the processor is configured to further:

determine whether an accumulated drop-off probability of the historical locations is greater than the drop-off threshold, and in response to a determination that the accumulated drop-off probability is greater, add the GPS coordinate as the drop-off point to the map.

7. The system of claim 6, wherein the drop-off probability of each historical location is accumulated to the accumulated drop-off probability by weighting a deviation distance from each historical location to the GPS coordinate.

8. The system of claim 1, wherein the drop-off probability is generated further based on proximity to one or more points of interest (POIs), wherein the POIs comprise shopping centers, restaurants, tourist attractions, office buildings, hotels, public transportation hubs, event venues, stadiums, and convention centers.

9. The system of claim 1, wherein the processor is configured to further adjust a destination based on one or more drop-off points near the destination provided by the user.

10. The system of claim 1, wherein the processor is configured to further update drop-off points based on user feedback and user operation of the vehicle.

11. The system of claim 10, wherein the user operation of the vehicle comprises dropping off a second user at a location near the drop-off point suggested to the second user.

12. The system of claim 1, wherein the processor is configured to further update the drop-off probability of the location based on continuous collections of user feedback and operation of the vehicle.

13. A method for generating drop-off points in a map comprising:

generating a drop-off probability of a location based on an disembarkation of a user from a vehicle, driving and stopping patterns of the vehicle, and geometric features around the location;

determining whether the drop-off probability is greater than a drop-off threshold;

in response to a determination that the drop-off probability is greater than the drop-off threshold, labeling the location as a drop-off point in the map; and wherein:

the location is detected by a location sensor, the disembarkation and the geometric features are detected by a proximity sensor, and the driving and stopping patterns of the vehicle are monitored by one or more sensors.

14. The method of claim 13, wherein the driving and stopping patterns are selected from braking patterns, idling patterns, hazard light usage patterns, detour patterns, vehicle door operation patterns, or a combination thereof.

15. The method of claim 13, wherein the method further comprises:

determining whether the stopping is associated with a non-drop-off event;

in response to a determination of the non-drop-off event, excluding the location as the drop-off point from the map; and wherein the stopping associated with the non-drop-off event is a traffic light or signal stopping, a limited-parking stopping, a stopping on narrow roads, a stopping at blind corners, a stopping at intersections, a stopping at crosswalks, or a stopping on one high-speed road.

16. The method of claim 13, wherein the method further comprises:

grouping, using a cluster algorithm, historical locations with essentially the same global positioning system (GPS) coordinate as a potential drop-off point of the location, wherein the drop-off probability associated with each historical location is less than or equal to the drop-off threshold;

determining whether an accumulated drop-off probability of the historical locations is greater than the drop-off threshold;

in response to a determination that the accumulated drop-off probability is greater, labeling the GPS coordinate as the drop-off point in the map; and wherein the drop-off probability of each historical location is accumulated to the accumulated drop-off probability by weighting a deviation distance from each historical location to the GPS coordinate.

17. The method of claim 13, wherein the drop-off probability is generated further based on proximity to one or more points of interest (POIs), wherein the POIs comprise shopping centers, restaurants, tourist attractions, office buildings, hotels, public transportation hubs, event venues, stadiums, and convention centers.

18. The method of claim 13, wherein the method further comprises adjusting a destination based on one or more drop-off points near the destination provided by a user.

19. The method of claim 13, wherein the method further comprises updating drop-off points in the map based on user feedback and user operation of the vehicle, wherein the user operation of the vehicle comprises dropping off a second user at a location near the drop-off point suggested to the second user.

20. The method of claim 13, wherein the method further comprises updating the drop-off probability of the location based on continuous collections of user feedback and operation of the vehicle.

* * * * *